Nov. 6, 1962  G. K. HAUSE ET AL  3,062,074
MULTI-PHASE TRANSMISSION

Filed Feb. 19, 1958  2 Sheets-Sheet 1

INVENTORS
Gilbert K. Hause &
Oliver K. Kelley
BY
W. C. Middleton
ATTORNEY

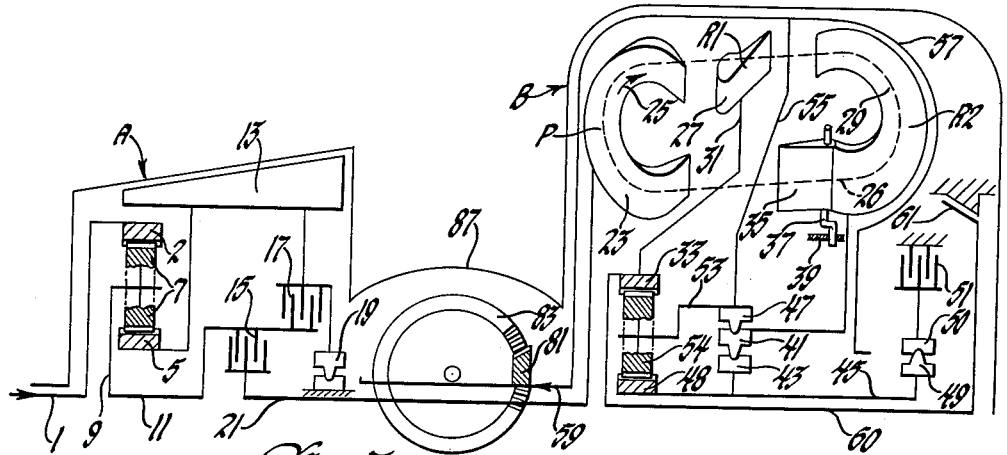

United States Patent Office 3,062,074
Patented Nov. 6, 1962

3,062,074
MULTI-PHASE TRANSMISSION
Gilbert K. Hause, Franklin, and Oliver K. Kelley, Bloomfield Hills, Mich., assignors to General Motors Corporation, Detroit, Mich., a corporation of Delaware
Filed Feb. 19, 1958, Ser. No. 716,124
12 Claims. (Cl. 74—677)

This invention relates to automatic transmissions and more particularly to automatic transmissions for motor vehicles of the type employing multi-element hydraulic torque converters combined with planetary gearing.

Hydrodynamic torque converters used in vehicles as torque multipliers have certain advantages since they can provide infinitely variable speed and torque changes within a limited range. A multi-phase torque converter, that is, one that performs both as a torque multiplying device and as a fluid coupling is especially well suited for use in automotive vehicles. When a multi-phase hydraulic torque converter is combined with mechanical gearing such as planetary gearing, its limited torque ratio range can be extended. By providing means for selectively changing the phase operation of the converter, such as by varying the blade angles of one or more of the fluid elements in the converter, the usefulness of the converter as a vehicle transmission is even further increased.

At high vehicle speeds it is desirable for fuel economy that the torque converter have a high coupling efficiency, that is a minimum of fluid slip between the input and output elements of the transmission. While it is possible to change from a high coupling efficiency phase of operation to a relatively high efficiency torque multiplying phase by changing the blade angle of one or more of the converter elements, at these high speeds the resulting torque multiplying effect is necessarily small and, hence, it is desirable to provide additional torque multiplying means such as mechanical gearing to obtain torque multiplication for vehicle acceleration purposes at these high speeds.

In an automotive vehicle there are certain advantages in having the transmission mounted in the rear of the vehicle, that is, adjacent the rear axle or differential instead of adjacent the engine. This advantage is primarily due to the size and space limitations in present day automotive vehicles which have the passenger compartment close to the ground. A transmission designed for installation in the rear of the vehicle, especially where a torque converter or fluid coupling having a relatively large diameter is used, should be preferably of a different configuration than that of a transmission designed for use adjacent the engine.

Accordingly, it is an object of the invention to provide a transmission utilizing a hydraulic torque converter combined with mechanical gearing that will be relatively simple in construction, have a wide torque multiplication range for operating vehicle including forward and reverse, provide maximum efficient performance under all conditions at all speeds, be smooth in operation and be suitable for installation in the rear of a vehicle.

It is a further object of the invention to provide a combined multi-phase torque converter and gearing unit in combination with a multiple speed mechanical gearing unit wherein the torque multiplication of the hydraulic converter can be varied by changing blade angles and the torque multiplication of mechanical gearing can be varied at will.

Still another object of the invention is to provide a transmission where reverse drive is obtained without any additional mechanical gearing.

In general, the invention involves the use of a three-element hydrodynamic torque converter having an impeller and two runners, with the first runner acting as a turbine in forward drive and as a stator in reverse drive. The second runner initially acts as a stator and, subsequently, as a turbine in forward drive and as a reversely rotating turbine in reverse drive. By providing a variable fluid exit portion on the second runner its operation can easily be changed from that as a stator to a turbine and vice versa. A planetary gear unit between the converter and transmission output shaft provides multiplication of torque from the first runner in forward drive and the second runner in reverse drive. This gear unit also acts to combine torque from both the runners in forward drive. A two-speed balanced inertia planetary gear unit is provided ahead of the torque converter to initially supply greater torque multiplication for starting or heavy load conditions or to provide torque multiplication when the converter is operating in coupling phase at a speed near or above its maximum torque multiplying speed.

Referring now to the figures in which:

FIGURE 3 is another embodiment wherein the rear axle is intermediate units of the transmission;

FIGURE 4 is still another embodiment; and

FIGURE 5 is a diagrammatic view showing the torque converter vanes and oil flow between the vanes of the torque converter of the preferred embodiment.

Figure 1:
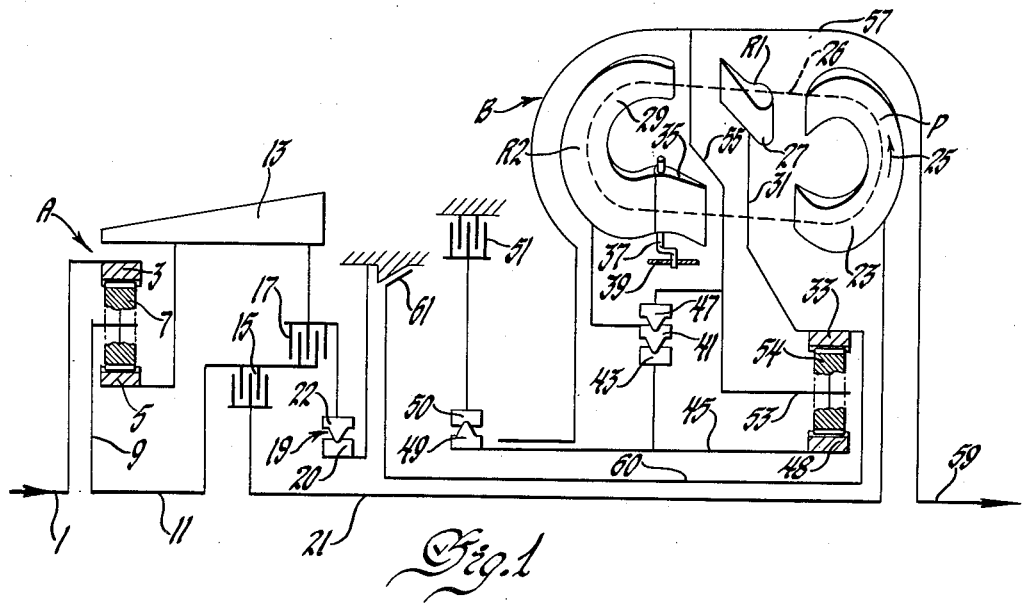
FIGURE 1 is a schematic and diagrammatic view of the preferred embodiment of the transmission.

Referring to FIGURE 1, which shows a schematic representation of the preferred embodiment of the invention, the transmission includes an input shaft 1 connected to drive a ring gear 3 of a planetary gear unit A. The front planetary gear set, generally referred to as unit A, also includes a sun gear 5 and one or more planet pinions 7 meshing with the ring gear 3 and sun gear 5. The pinions 7 are mounted on a gear carrier 9 connected to output shaft 11, and an inertia mass 13 is connected to the sun gear 5. A neutral clutch 15 is provided to connect the shaft 11 with an intermediate shaft 21 and a direct drive clutch 17 is provided to connect the mass 13 and sun gear 5 with the shaft 11 and connected to carrier 9 to lock up the planetary gearing for direct drive. The clutches 15 and 17, the details of which form no part of the invention, are shown of the disk type; however, they may be of any suitable form. A one-way device 19 is provided to prevent reverse rotation of the inertia mass 13 and sun gear 5. The one-way device 19 is shown schematically in the figure to represent a ratchet or freewheel device wherein the lower portion 20 will allow the upper portion 22 to freely rotate clockwise relative to 20 as viewed from the left but will prevent counterclockwise rotation or movement into the plane of the paper by element 22. Hereinafter all rotations of elements in the transmission in the embodiment of FIGURE 1 as well as the embodiments shown in the other figures, will be as seen from the left, with clockwise rotation representing forward rotation and counterclockwise rotation representing reverse rotation.

The intermediate shaft 21 serves as the input shaft for the combined hydraulic and gearing unit, generally referred to as unit B, and which includes an impeller or pump wheel P represented by vane 23 having a forward bend exit portion. The impeller P is adapted to circulate working fluid in the direction of arrow 25 in a closed toroidal path represented by the dashed line 26. A first runner or turbine wheel represented in the figures and hereinafter referred to as R1 carries a series of vanes 27. A second runner or turbine represented in the figures and hereinafter referred to as R2 carries a series of main vanes 29 and a series of pivoted exit vane portions 35 rotatable about pivot pins 37 by any suitable means represented by block 39.

As seen in FIGURE 5, the adjustable vane portion 35 of R2 can be moved from the dotted position 35a to the dotted position 35b. The means 39 for moving the pivot crank 37 which forms no part of the invention, may be a hydraulically actuated piston, electrical means, mechanical means or other suitable actuating means. First runner R1 is connected by means of spokes 31 to a ring gear 33. The spokes 31, details of which are not shown, should be of air foil or other configuration so as to least block the free passage of fluid in its toroidal path. A second runner R2 is connected by means of a one-way device 41—47 to spokes 55 which pass through the toroidal path between R1 and R2 and are connected to an outer rotatable shell 57 which is fastened to the output shaft 59. The one-way device 41—47 allows reverse rotation of R2 relative to the spokes 55 but will transmit forward rotation of R2 to the spoke element 55.

The outer portion 47 of the one-way device 41—47 is also connected to a gear carrier 53 that rotatably supports one or more planet pinions 54 meshing with the ring gear 33 and a sun gear 48 carried by a shaft 45. A one-way device 41—43 shown mounted internally of one-way device 41—47 connects the runner R2 to the sleeve shaft 45. One-way device 41—43 prevents reverse rotation of R2 relative to shaft 45, but allows free forward rotation relative to shaft 45. Another one-way device 49—50 adapted to be connected by means of a brake 51 to a stationary portion of the transmission acts to prevent reverse rotation of shaft 45. Brake 51 may be of multiple disk type, as shown, or may be a cone device, brake band or other suitable element. When brake 51 is engaged, the one-way device 49—50 prevents reverse rotation of the shaft 45 but allows free forward rotation thereof.

The runner R1, spoke 31 and ring gear 33 are connected by a sleeve shaft 60 to a brake element 61, of cone type, as shown, or may be multiple disk or brake band type. Brake 61, when applied, holds the sleeve shaft 60 from rotation in either direction.

*Front Gear Unit Operation*

The operation of the device shown on FIGURE 1 is as follows: In neutral, clutch 15 is disengaged while clutch 17 may either be engaged to lock up the front unit gearing for direct front unit start or may be disengaged for low ration start. To establish forward drive in the transmission the clutch 15 and brake 51 are engaged. The one-way device 49—50 then prevents reverse rotation of the shaft 45 and sun gear 48 and through the one-way device 41—43 reverse rotation of the runner R2 is prevented. Front planetary unit A may be normally conditioned for reduction drive with clutch 17 disengaged or normally conditioned for direct drive with clutch 17 engaged. In reduction drive the one-way device 19 prevents reverse rotation of the weight 13 and sun gear 5 and with the imput shaft 1 and ring gear 3 rotating forwardly (clockwise as viewed from the left of FIGURE 1) and the sun gear held against reverse rotation (counterclockwise rotation as viewed from the left of FIGURE 1) by the one-way device 19, the carrier 9 is caused to rotate forward at a reduced speed and through shaft 11 and neutral clutch 15 cause the intermediate shaft 21 to be rotated at the same speed as carrier 9. This causes forward reduced speed rotation of the pump P which circulates oil in the direction of arrow 25 in the dotted lines 26.

The front planetary unit A may also be normally conditioned for direct drive merely by normal application of clutch 17, shown as a multiple disk clutch but which may be of any suitable type. The clutch 17 acts to connect the mass B and sun gear 5 directly to the gear carrier 9, and shaft 11 and through clutch 15 to the intermediate shaft 21. This acts to lock up the gear set for one-to-one ratio drive with the one-way device 19 overrunning.

It is understood that the control for clutch 17 which forms no part of this invention may be automatic, that is, it may be operable in response to a speed and/or torque condition of some element of the transmission, for example output shaft governor and engine throttle position, or it may be manual such as by a lever or pedal control.

The effect of inertia mass 13 during shifts from reduction to direct or direct to reduction drive in unit A is fully described in the patent application S.N. 504,992 by Oliver K. Kelley et al., entitled, "Balanced Inertia Plural Step Ratio Transmission," filed April 29, 1955, now Patent No. 3,023,636. In general, the mass 13 is chosen so that its moment of inertia added to that of the sun gear 5, and associated parts when multiplied by its total change in speed equals the moment of inertia of the input shaft and associated parts multiplied by their total change in speed during a gear shift. For example, if the front gear set A has a reduction ratio of 1.6 to 1, between the ring gear and carrier, and the output carrier of the gear set is rotating at 1,000 r.p.m., with the unit in reduction the engine and input shaft 1 would be rotating at 1,600 r.p.m. and the sun gear 5 and weight 13 would be stationary. If the unit A is then placed in direct drive by engaging clutch 17, the engine and input shaft 1 would decrease to 1,000 r.p.m., a loss of 600 r.p.m., and the mass 13 and gear 5 would increase from 0 to 1,000 r.p.m., a gain of 1,000 r.p.m. Mass 13 should then be chosen so that the moment of inertia of itself and associated parts times 1,000 r.p.m. equals the moment of inertia of the input shaft and ring gear two times 600 r.p.m. This means that the total moment of inertia of mass 13, etc. should be 600/1,000 or six-tenths (0.6) that of the input shaft, etc. As set forth in the Kelley et al. application referred to above, such an arrangement will have upshifts and downshifts, without any sudden change in direction of torque in any of the drive train elements and a smooth shift will result.

*Converter Unit Operation, First Phase*

Figure 2:
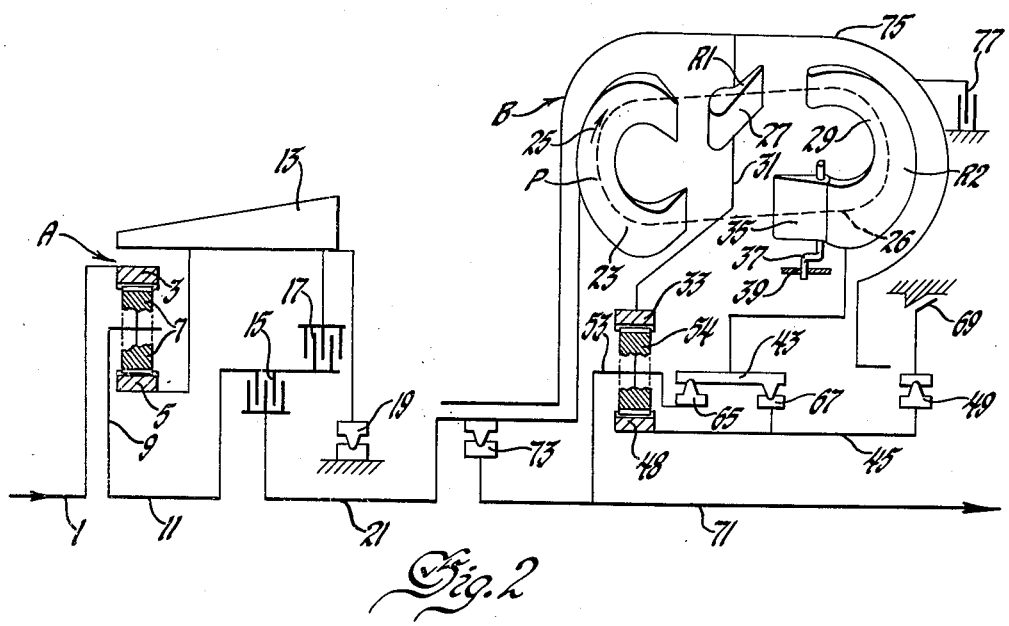
FIGURE 2 is a schematic view of another form.

Referring to FIGURE 5 which applies specifically to the preferred embodiment of FIGURE 1 but which generally applies also to FIGURES 2, 3 and 4, it can be seen the oil leaving the impeller vanes 23 will be moving in a forward tangential direction and will impinge on the vanes 27 of the runner R1 to urge it, spoke 31 and ring gear 33 in a forward direction. The vanes 27 of R1, which are rotated forwardly at a rate slower than that of the impeller, turn the oil flow to a reverse direction (upward as seen in FIGURE 5) so that fluid impinging on R2 acts on the underside of vanes 29 to urge them and R2 in a reverse or counterclockwise direction. Reverse rotation of R2 is prevented by means of one-way device 41—43, one-way device 49—50 and brake 51. R2, in this phase of operation, acts as a fluid reaction stator and changes flow of the oil from a reverse to a forward direction so that when the oil leaving the variable exit vane portion 35 of R2 impinges on the entrance portions of vanes 23 of the pump, the oil will have a forward tangential velocity.

By varying the position of the exit vane portions 35, the exit angle of oil leaving R2 can be changed. With R2 stationary the actual or absolute direction of oil flow from R2 will be the same as the relative direction of flow. Changing the exit angle of the vane portions 35 of R2 has two effects: (1) that of varying the actual reaction force and negative torque on R2 so that the greater the exit angle the greater the total angle the oil direcion will be changed by R2 and, hence, the greater the negative force acting on R2; and (2) that of changing the absolute direction of oil entering the pump to vary the magnitude of tangential velocity component of oil leaving the pump and, hence, the available torque that can be impressed on R1. The additional negative or reaction torque on R2 due to increase the exit angle of R2 will equal the additional positive torque available for action on R1.

As stated above the direction of the oil leaving the secondary turbine R2 is influenced by the position of the variable exit vane portions 35. The dotted lines 35a indicate the maximum clockwise position of the vane portions 35 of R2. With the vanes in this position there will be a maximum reverse turning of oil passing between the vanes 35 and, consequently, a maximum of torque absorption by R2 for transmittal directly to the output spoke 55 through a one-way device 41—47. Under these conditions a maximum coupling effect is obtained. With the vane portions 35 in their extreme counterclockwise position represented by the dotted lines 35b (FIG. 5) the fluid leaves the secondary runner R2 in a direction having a substantial forward tangential velocity component which when added to the forward velocity impressed on the fluid by the impeller vanes 25 provides a total tangential velocity that is substantially greater than the forward tangential velocity imposed on the oil by the pump vanes 25 alone. This results in a greater available oil velocity available for impressing torque on R1 and provides maximum torque multiplication. The torque on R1 is equal to the arithmetic total of the positive torque impressed on the vanes by the pump P and the negative torque acting on the secondary runner R1.

As the vehicle, output shaft 59, carrier 53, ring gear 33 and the first runner R1 pick up speed, the oil leaving R1 flows with a smaller rearward absolute tangential direction due to the increased forward velocity of vanes 27. With the second runner R2 receiving fluid in a less rearward direction, the vanes of R2 will turn the oil through a smaller angle resulting in a lesser negative torque acting on R2 to urge it in a reverse direction. Also, with an increased forward speed of the pump P, the fluid entering the pump vanes 29 from R will move tangentially relatively less forwardly. Consequently, R2 will then impose a smaller fraction of the total forward tangential velocity of the oil available to impress forward torque on R1 than it imposes during the initial or stall condition. As the first runner R1 continues to rotate still faster, eventually the fluid leaving the vanes 27 of runner R1 will have only axial motion with no reverse tangential component. However, if the variable exit vanes 35 are in the position indicated by 35b, even though the oil moves across the secondary runner vanes 29 in an axial direction, exit vanes 35 will turn the oil forwardly resulting in a continued small negative torque on R2.

*Second Phase*

At some speed, depending on the position of the exit vanes 35, the negative or reverse torque on R2 will cease, and the oil entering the pump will have no forward tangential velocity. With this condition there is no hydrodynamic torque conversion or multiplication in the hydraulic torque transmitting device and the overall torque multiplication of the transmission unit B will be solely that of the mechanical gearing as determined by the number of teeth or pitch diameters of the gears.

The transmission is then in its second phase wherein the pump and R1 form a coupling, and as R1 rotates still faster, the oil leaving R1 will eventually have sufficient absolute forward velocity to act on R2 to urge it clockwise or forwardly. However, so long as R2 is rotating slower than the speed of carrier 53 as driven by R1 through ring gear 33, R2 will not transmit torque on the carrier. The one-way device 41—47 allows R2 to rotate slower than carrier 53.

*Third Phase*

When the forward rotational speed of R2 increases to the point where it equals the speed of carrier 53 as driven by R1 acting through the planetary gearing, R2 will begin to impress torque on the spoke 55 and output shaft 59 through one-way device 41—47. The transmission will then be in its third phase or double turbine coupling phase.

As R1 further increases speed, oil from the pump passing between the vanes 27 of R1 is turned less due to the increased tangential velocity of vanes 27 relative to the absolute tangential velocity of the oil leaving the pump. With the oil turned through a smaller angle by R1 less torque is absorbed by R1. Also oil leaving R1 has a greater forward component due to the increasing speed of the pump and the smaller turning by R1. This greater forward component increases the velocity of oil acting on R2. The torque from R2 goes directly to the output carrier 53 and is not multiplied as is the gear multiplied torque from R1. Therefore, as the torque shifts from 100% on R1 to 100% on R2 the overall torque ratio of unit B gradually changes from the gearing ratio to one-to-one ratio.

*Fourth Phase*

When R1 is rotating fast enough so that its vanes effect a zero change in oil direction, no torque will be exerted on R1 and all of the torque will be impressed on R2. This is the fourth phase of unit B wherein P and R2 act as a coupling driving the output shaft with no torque multiplication. With the torque on R1 zero there is no reverse reaction force on sun gear 48 and it begins to rotate forward until R2 and carrier 53 have reached a speed approximately that of ring gear 33 and R1. The gearing will then be rotating almost as a locked up unit. Any slip or difference in speeds between P and R2 can be minimized by moving the exit vane portions 35 of R2 to the 35a position so that maximum efficiency can be obtained in the coupling phase. R1 during the fourth phase will run free in the oil circuit and will assume a speed of rotation that will present the least resistance to oil flow through the R1 vanes.

*No Back*

When the transmission is in forward drive with brake 51 applied the output shaft 59 is prevented from reverse rotation by means of one-way devices 47—41, 41—43 and 49—50. This eliminates having to apply the vehicle brakes while idling the vehicle on a hill. This feature is also present in the other forms shown in FIGS. 2, 3 and 4.

*Vane Control*

As mentioned above, the pivotally mounted exit vanes 35 of R2 are rotated by means 39. This means for moving the vanes forms no part of the present invention; however, it is contemplated that the means 39 will be controlled in accordance with some output shaft load or torque demand function. This might be represented by the position of the accelerator pedal, by engine manifold vacuum or some combination of the two. The means 39 may be multiposition, that is, movable between two, three or more fixed positions representing optimum blade angle positions or it might be infinitely varied between two extreme positions. In general, the control should provide the proper vane angle for optimum torque multiplication with maximum efficiency under varying torque demand, relative or absolute speed and actual torque conditions.

By providing a control that senses increased torque demand such as increased throttle position or decreased engine vacuum, the transmission can be changed from the fourth coupling phase to the third, second or even first phase depending on the relative and absolute speeds of the converter elements and the vane angles used for maximum torque multiplication. Thus while cruising in the fourth coupling phase, i.e. with R2 vanes in 35a position if the vehicle operator should desire increased performance, his act of opening the throttle might either directly, or indirectly through an engine vacuum sensitive control, cause the vanes of R2 to pivot counterclockwise, as viewed in FIGURE 5, and change to a different phase operation with increased torque multiplication. For example, by moving the exit vanes 27 toward their dotted line position 35b of FIG. 5 the oil can be made to impart a reverse torque on R2 to hold it stationary through one-way device 41—43, in which case the first or hydrodynamic torque multiplying phase will be resumed. Upon cessation of the performance demand, the vanes would be returned to their coupling positions.

*Reverse Operation*

To obtain reverse drive of output shaft 59, forward brake 51 is released and reverse brake 61 applied. R1 and ring gear 33 are then held against rotation in either direction. As pump P rotates forward, oil is circulated in a tangentially forward direction to impinge on vanes 27 of R1. The oil is then turned in a reverse direction by the vanes and exits R1 moving in a reverse tangential direction. The reversely rotating oil then impinges on the main vane portion 29 of R2 wherein it imparts reverse torque on the R2 runner and through one-way device 41—43 rotates shaft 45 in a backward direction, one-way device 49—50 being ineffective to prevent reverse rotation due to brake 51 being released. The sun gear 48 attached to shaft 45 is then driven reversely. With ring gear 33 held against rotation by brake 61, reverse rotation of sun 48 causes reduced speed-torque multiplied reverse rotation of carrier 53. Output shaft 59 is driven through the spokes 55 and casing 57 reversely at reduced speed and increased torque. The torque ratio due to hydrodynamic multiplication in the converter will be the arithmetic sum of the input torque plus the positive reaction torque on R1 divided by the input torque. Since in reverse drive the reaction member R1 of the converter and reaction ring gear 33 of the gearing cannot rotate in either direction, neither the converter or gearing can assume one-to-one ratios. As reverse driving of motor vehicles is generally done at low speeds and for short distances this is similar to the limited range ratio reverse drive in other types of vehicle transmissions.

By varying the angles of the exit vanes 35 of R2 the maximum torque multiplication at stall can be varied in reverse drive similarly to the changes in torque multiplication in forward drive. Thus, the more the exit vanes 35 of R2 are moved toward their dotted line position 35b of FIG. 5 the greater the reverse torque there will be impressed on R2. In addition oil leaving R2 will have a greater forward velocity when re-entering the pump P which, when added to the forward velocity given the oil by the pump, will result in a greater velocity of oil leaving the pump to impress reverse driving torque on R2.

*Coast*

During vehicle coast, i.e. with the input shaft rotating slower than output shaft, the carrier 53 connected to the output shaft will act through the gearing to rotate the sun gear 48, shaft 45 and through one-way device 43—41 rotate R2 forward. With R2 driven by the output shaft, R2 will act to circulate oil to act on the impeller P through the front gear unit A, which is locked by clutch 17, act to drive the engine which provides engine braking for the vehicle.

Referring now to FIG. 2, which shows a slightly different arrangement, the front planetary gear unit A is identical with that of FIG. 1 and functions exactly the same way. The torque converter unit B is essentially the same as that of FIG. 1 with certain elements located differently. The fluid transmitting elements P, R1 and R2 are the same; however, the output is taken directly from the carrier 53 to output shaft 71 instead of through the spokes 55 of FIG. 1 extending through the toroidal path to a rotatable outer casing.

In the FIG. 2 modification the outer shell 75 is connected to rotate with R1 which is again directly connected with a ring gear 33 of the planetary gear unit. The one-way device 43—65 transmits forward rotational drive from R2 to the carrier 53 while one-way device 43—67 transmits reverse torque from R2 to shaft 45 and sun gear 48. A one-way device 49 acts to prevent reverse rotation of shaft 45, gear 48 and R2 when brake 69 is applied. The brake 69 of FIG. 2 functions in the same manner as brake 51 of FIG. 1 and when applied provides reaction for both the fluid torque converter reaction element R2 and the mechanical gear sun gear 48.

Reaction for reverse drive of the FIG. 2 transmission is provided by a disk brake 77 which may be constructed as a cone brake or a band. The brake 77 when applied acts to prevent rotation of shell 75, reverse stator R1 and ring gear 33.

An additional one-way device 73 is provided between the output shaft 71 and intermediate shaft 21 to prevent the output shaft 71 from rotating faster than intermediate shaft 21, and with front unit A in direct drive, prevent the output shaft 71 from rotating faster than input shaft 1. The operation of the FIG. 2 transmission through its various phases is the same as that of FIG. 1.

FIG. 3 shows another form of transmission embodying the invention. In this form the output of the transmission is between units A and B and goes to a differential pinion gear 81 that meshes with a differential ring gear 83 mounted transversely to the transmission. Again unit A is the same as unit A of FIG. 1. Outer shell 57 which provides the output to output shaft 59, is connected to the carrier 53 through spokes 55 and as in the preferred form of FIG. 1, while R1 is connected through spokes 31 to ring gear 33. The reverse reaction brake 61, shown as a cone type, is located to the rear of unit B instead of between units A and B, as shown in FIG. 1. Likewise the forward drive reaction brake 51 is located to the rear of unit B. The entire transmission including the front unit A, rear unit B and the differential pinion and ring gear are shown enclosed in an outer stationary case 87, although the units may be enclosed in separate casings. The FIG. 3 modification operates in the same manner as that of FIG. 1.

Still another form of transmission incorporating the invention is shown in FIG. 4. The front unit A of FIGS. 1, 2 and 3 may be used with this arrangement or the shaft 21 may serve as the transmission input shaft. The FIG. 4 transmission differs from those shown in FIGS. 1, 2 and 3 primarily in use of double pinion planetary gear set with the fluid elements connected to different gear members.

The FIG. 4 transmission includes an input shaft 21 arranged to drive an impeller P. The impeller circulates fluid to act on the first runner R1 connected to drive a half shell 101 and on a second runner R2. The three hydraulic elements P, R1 and R2, are the same as those in the FIGS. 1, 2 and 3 forms. The half shell 101 is connected to a planetary gear carrier 89 having two intermeshing sets of planetary pinion gears 91 and 93. The carrier 89 is also connected to a reverse reaction brake 117 adapted to hold the carrier 89 and runner R1 from rotation. The outer pinion gears 91 mesh with a ring gear 95 and the inner pinions 93 mesh with a sun gear 94. Sun gear 94 is connected to a sleeve shaft 105 similar to shaft 45 of FIG. 1 and can be held against reverse rotation by one-way device 107 and a reaction brake 109. The shaft 105 is also connected through a one-way device 103 to the second runner R2.

Secondary runner R2 is connected by spokes 111 to a half shell 113 diametrically opposite the half shell 101. A one-way device 115 acts to transmit forward drive from the shell 111 to an output shaft 99. Ring gear 95 which forms the output member of the gear unit is also connected directly to the ouput shaft 99 by means of an outer shell member 119 that encloses the whole hydraulic torque transmitting device.

Operation of the arrangement shown in FIG. 4 is similar to the other forms. For forward drive brake 109 is applied which through one-way device 107, prevents reverse rotation of shaft 105 and sun gear 94. Also reverse rotation of R2 is prevented by one-way device 103. Upon rotation of shaft 21 the impeller circulates oil in the direction of arrow 25 in a toroidal path 26. Oil acting on R1 urges it and carrier 89 in a forward direction.

In the first phase of operation, the oil leaving the vanes 27 of R1 acts on the vanes 29 of R2 to urge R2 rearwardly; however, such reverse rotation is prevented by one-way devices 103 and 107 and brake 109. With sun gear 94 held against reverse rotation forward rotation of carrier 89 causes reduced speed, torque multiplied forward rotation of ring gear 95. This drive of ring gear 95 is transmitted to the output shaft 99 through the outer shell 119. As the fluid leaving the vanes of R1 begins to have a forward component, the oil begins to act on R2 to urge it in a forward direction and, depending on the position of the variable angle vanes 35, eventually rotates R2 forwardly. Forward rotational force on R2 is transmitted through the spokes 111 to shell 113 and through one-way device 115. When R2 reaches the speed of the output shaft 99 as it is driven by R1 acting through the gearing R2, it will directly drive the output shaft 99 with one-way device 107 allowing shaft 105 and sun gear 94 to free wheel forwardly. This allows R1 to run free in the fluid circuit, the speed of R1 being greater than that of pump P due to the forward bend exit portion on the vanes 23.

For reverse drive, brake 109 of FIG. 4 is released and brake 117 applied to hold the carrier 89 and runner R2 fixed against rotation. Fluid circulated by the impeller P in a forward direction is turned in a reverse direction by the vanes of fixed R2 and acts on R2 to rotate the same in a reverse direction. With carrier 89 held by brake reverse 117 the reverse rotation of R2 is transmitted through one-way device 103 to the sun gear 94 which rotates pinion gears 93 clockwise as viewed from the left. Gears 93 rotate on fixed carrier 89 and in turn rotate gears 91 counterclockwise on carrier 89. Ring gear 95 is then rotated counterclockwise by pinions 91 and through outer shell 119 drives output shaft 99 in a reduced speed reverse direction. As in the case of the arrangements of FIGS. 1, 2 and 3, the reverse ratio is always a reduction ratio since the reverse fluid reaction member R1 is always held as is the pinion carrier.

It will be understood that the controls used to vary the position of variable vanes 35 as well as the ratio of the front planetary gear unit A can be arranged to produce a variety of ratio changing sequences. Thus, the rear unit B can be controlled independently of unit A or it can be jointly controlled. It will be noted that a change in ratio in unit A will have an effect on unit B since changing the front unit A from direct to reduction or vice-versa, will change the speed and torque impressed on impeller P with a resulting change in oil direction and velocity in the hydraulic converter and under some conditions a shift in unit A will change the operation of the converter from a coupling phase to a torque multiplying phase. For example, if the unit A is in direct drive and the unit B is in torque multiplying phase, a downshift in the front unit A will act to increase the torque acting on impeller P but lower its speed resulting in oil leaving the vanes of pump P having a lesser forward tangential velocity. The oil will then flow between the vanes of R1 more axially and exert a smaller tangential or rotating force on R1. The oil leaving R1 will not have been reversed as much by the vanes of R1 and consequently will act in a more forward tangential direction on R2. The result would be that the drive would shift from a phase where R1 drives the output shaft through the gearing at a torque multiplication to drive from R2 directly.

It will be seen that there has been provided a transmission that is relatively simple and yet capable of easily controlled substantial torque multiplication over a fairly large speed range with maximum efficiency during all phases of operation. Other combinations of hydraulic elements and mechanical gearing could be utilized within the scope of the invention for different applications. For example, the overall torque range can be increased by increasing the ratio of the gearing or additional gearing could be utilized. While the invention is usable in transmission installations in motor vehicles having the transmission mounted adjacent the engine it is intended primarily for use in the rear of the vehicle adjacent the rear axle or differential.

We claim:

1. In a transmission, an input shaft and an output shaft, a variable speed gear unit connected to be driven by said input shaft, a hydrodynamic torque converter device having an impeller connected to be driven at a plurality of different speeds by said gear unit, a first runner adapted to be driven in a forward direction by fluid circulated by said impeller, and a second runner, means for causing said second runner to be driven in a forward direction or a reverse direction by fluid circulated by said impeller, a planetary gear unit having coacting gear elements including a first gear element connected to said first runner, a second gear element connected through a one-way means to said second runner for transmitting reverse drive of said second runner to said second gear element and a third element of said planetry gear unit connected through a one-way means to said second runner for transmission of forward drive from said second runner to said third element, said third element connected to said output shaft, and means for selectively preventing reverse rotation of said second gear element.

2. In a transmission, an input shaft and an output shaft, a variable speed gear unit connected to be driven by said input shaft, a hydrodynamic torque converter device having an impeller connected to be driven at a plurality of different speeds by said gear unit, a first runner adapted to be driven in a forward direction by fluid circulated by said impeller, and a second runner, means for causing said second runner to be driven in a forward direction or a reverse direction by fluid circulated by said impeller, a planetary gear unit having coacting gear elements including a gear carrier element connected to said first runner, a sun gear element connected through a one-way means to said second runner and a ring gear element connected through a one-way means to said second runner, said ring gear element connected to said output shaft, and means for releasably preventing reverse rotation of said sun gear element.

3. In a transmission, an input shaft and an output shaft, a variable speed gear unit connected to be driven by said input shaft, a hydrodynamic torque converter device having an impeller, releasable means connecting said impeller to be driven at a plurality of different speeds by said gear unit, a first runner adapted to be driven in a forward direction by fluid circulated by said impeller, and a second runner, means for causing said second runner to be driven in a forward direction or a reverse direction by fluid circulated by said impeller, a planetary gear unit including a ring gear connected to said first runner, a carrier member connected through a one-way means to said second runner and a sun gear connected through a one-way means to said second runner, said carrier member connected to said output shaft, means for releasably preventing reverse rotation of said sun gear element and means for selectively preventing forward rotation of said ring gear.

4. In a transmission, an input shaft and an output shaft, a variable speed gear unit connected to be driven by said input shaft, a hydrodynamic torque converter device having an impeller connected to be driven at a plurality of different speeds by said gear unit, a first runner adapted to be driven in a forward direction by fluid circulated by said impeller, and a second runner, means for causing said second runner to be driven in a forward direction or a reverse direction by fluid circulated by said impeller, a planetary gear unit having a first gear element connected to said first runner, a second gear element connected through a one-way means to said second runner and a third element of said planetary gear unit connected through a one-way means to said second runner, said third element connected to said output shaft, means for selectively preventing reverse rotation of said second gear element to provide forward drive gear reaction in said planetary gear unit, and means for selectively preventing rotation of said first gear element to provide reverse drive reaction in said converter device and said planetary gear unit.

5. In a transmission of the class described, an input shaft and an output shaft, a combination multiphase hydraulic torque transmitting device and planetary gearing unit having coacting gear elements adapted to drive said output shaft in either a forward or a reverse direction, said torque transmitting device comprising a rotatable outer shell connected to said output shaft, a radial outflow type impeller within said shell connectable to be driven from said input shaft and adapted to circulate working fluid in a toroidal path within said shell, a first axial flow runner element within said shell adapted to be driven by working fluid circulated by said impeller and connected through said toroidal path to drive a first element of said gearing unit, means for preventing rotation of said first runner in at least one direction, a second runner element having both radial inflow and axial flow portions adapted to be driven by working fluid circulated by said impeller and to return the fluid directly to said impeller, said second runner having a one-way forward driving connection with a second element of said gearing unit, said second runner having a one-way reverse driving connection with a third element of said gearing unit, means for selectively preventing reverse rotation of said second runner, and means connecting said second element of said gearing unit to said shell.

6. In a transmission of the class described, an input shaft and an output shaft, a combination multiphase hydraulic torque transmitting device and planetary gearing unit having coacting gear elements adapted to drive said output shaft in either a forward or a reverse direction, said torque transmitting device comprising a rotatable outer shell connected to said output shaft, a radial outflow type impeller within said shell connectable to be driven from said input shaft and adapted to circulate working fluid in a toroidal path within said shell, a first axial flow runner element within said shell adapted to be driven by working fluid circulated by said impeller and connected to drive a first element of said gearing unit, means for preventing reverse rotation of said first runner to provide reaction in said hydraulic torque transmitting device, a second runner element having radial inflow and axial flow portions adapted to be driven by working fluid circulated by said impeller and return the fluid to said impeller, said second runner having a one-way forward driving connection through said toroidal path with a second element of said gearing unit, said second runner having a one-way reverse driving connection with a third element of said gearing unit, means for selectively preventing reverse rotation of said second runner, and means connecting said second element of said gearing unit to said shell.

7. In a transmission of the class described, an input shaft and an output shaft, a combination multiphase hydraulic torque transmitting device and planetary gearing unit having coacting gear elements adapted to variably drive said output shaft in either a forward or a reverse direction, said torque transmitting device comprising a rotatable outer shell connected to said output shaft, a radial outflow type impeller within said shell connectable to be driven from said input shaft and adapted to circulate working fluid in a toroidal path within said shell, a first axial flow runner element within said shell adapted to be driven by working fluid circulated by said impeller and connected through said toroidal path to drive a first element of said gearing unit, means for preventing rotation of said first runner and said first element in at least one direction, a second runner element having radial inflow and axial flow portions adapted to be driven by working fluid circulated by said impeller and return the fluid to said impeller, said second runner having a one-way forward driving connection with a second element of said gearing unit, means for selectively preventing reverse rotation of said second runner, said second runner having a one-way reverse driving connection with a third element of said gearing unit, means connecting said second element of said gearing unit to said shell, said axial flow portion of said second runner being angularly adjustable, and means for varying the angle of said axial flow portion to change the direction of flow of fluid leaving said second runner.

8. In a transmission of the class described, an input shaft and an output shaft, a combination multiphase hydraulic torque transmitting device and planetary gearing unit having coacting gear elements adapted to variably drive said output shaft, said torque transmitting device comprising a rotatable outer shell connected to said output shaft, a radial outflow type impeller within said shell connectable to be driven from said input shaft and adapted to circulate working fluid in a toroidal path within said shell, a first axial flow runner element within said shell adapted to be driven by working fluid circulated by said impeller and connected through said toroidal path to drive a first element of said gearing unit, means for releasably preventing rotation of said first runner and said first element, a second runner element having radial inflow and axial flow portions adapted to be driven by working fluid circulated by said impeller and return the fluid to said impeller, said second runner having a one-way forward driving connection with a second element of said gearing unit, means for selectively preventing reverse rotation of said second runner, means connecting said second element of said gearing unit to said shell, a forward drive reaction gear element, said second runner having two phases of operation, the first phase as a reaction flow directing element and the second phase as a turbine element, said axial flow portion of said second runner being angularly adjustable, and means for varying the angle of said axial flow portion to change the operation of said second runner from one phase of operation to another phase.

9. In a transmission of the class described, an input shaft and an output shaft, a combination multiphase hydraulic torque transmitting device and planetary gearing unit having coacting gear elements adapted to drive said output shaft in either a forward or a reverse direction, said torque transmitting device comprising a rotatable outer shell connected to said output shaft, a radial outflow type impeller within said shell connectable to be driven from said input shaft and adapted to circulate working fluid in a toroidal path within said shell, a first axial flow runner element within said shell adapted to be driven by working fluid circulated by said impeller and connected through said toroidal path to drive a first element of said gearing unit, means for preventing rotation of said first runner in at least one direction, a second radial inflow and axial flow runner element adapted to be driven by working fluid circulated by said impeller and return the fluid to said impeller, said second runner having a one-way forward driving connection with a second element of said gearing unit, said second runner having a one-way reverse driving connection with a third element of said gearing unit, means for selectively preventing reverse rotation of said second runner, and means extending through said toroidal path connecting said second element of said gearing unit to said shell.

10. In a transmission, a multi-runner hydraulic torque transmitting device operatively connected through a planetary gearing having coacting gear elements to drive an output shaft either in a forward or a reverse direction comprising in combination: a rotatable outer casing connected to said output shaft, a first shaft extending into said casing, an impeller within said casing connected to be driven in a forward direction by said first shaft to circulate working fluid in a toroidal path within said casing, a first runner within said casing adapted to be driven in a forward direction by working fluid circulated by said impeller, a second shaft surrounding said first shaft extending into said casing and connected to said first runner element, a second runner adapted to be driven either forwardly or reversely by working fluid circulated by said impeller, a first one-way driving connection between said second runner and said casing for transmitting forward rotational drive from said second runner to said casing, a third shaft surrounding said second shaft extending into said casing device, releasable brake means for preventing rotation of said third shaft in at least one direction, a second one-way driving connection between said second runner and said third shaft for preventing reverse rotation of said second runner when said third shaft is held by said brake means, planetary gearing enclosed in said casing including sun gear, ring gear and carrier elements, said first runner connected to one element of said gearing, means connecting a second element of said gearing to said casing, and a two-way drive connection between a third element of said gearing and said third shaft.

11. In a transmission, a multi-runner hydraulic torque transmitting device operatively connected through a planetary gearing having coacting gear elements to drive an output shaft either in a forward or a reverse direction comprising in combination: a rotatable outer casing connected to said output shaft, a first shaft extending into said casing, an impeller within said casing connected to be driven in a forward direction by said first shaft to circulate working fluid in a toroidal path within said casing, a first runner within said casing adapted to be driven in a forward direction by working fluid circulated by said impeller, a second shaft surrounding said first shaft extending into said casing and connected through said toroidal path to said first runner element, a second runner adapted to be driven forwardly by working fluid circulated by said impeller, a one-way driving connection between said second runner and said casing for transmitting forward rotational drive from said second runner to said casing, a third shaft surrounding said second shaft extending into said casing device, means for selectively preventing rotation of said third shaft, a second one-way driving connection between said second runner and said third shaft for preventing reverse rotation of said second runner when said third shaft is held by said brake means, planetary gearing enclosed in said casing, said first runner connected to one element of said gearing, means connecting a second element of said gearing to said casing, and reaction means for said gearing including a third element of said gearing connected through releasable means to a stationary member of said transmission.

12. In a transmission, an input shaft and an output shaft, a variable speed gear unit connected to be driven by said input shaft, a hydrodynamic torque converter device having an impeller adapted to circulate working fluid in a toroidal path, releasable means connecting said impeller to be driven at a plurality of different speeds by said gear unit, a first runner adapted to be driven in a forward direction by fluid circulated by said impeller, a rotatable shell enclosing said working fluid and connected to said first runner, and a second runner, means for causing said second runner to be driven in a forward direction or a reverse direction by fluid circulated by said impeller, a planetary gear unit having coacting gear elements including a ring gear connected to said first runner through said toroidal path, a carrier member connected through a one-way means to said second runner and a sun gear connected through a one-way means to said second runner, said carrier member connected to said output shaft, means for releasably preventing reverse rotation of said sun gear element and means for selectively preventing forward rotation of said shell.

References Cited in the file of this patent

UNITED STATES PATENTS

| | | |
|---|---|---|
| 2,152,113 | Van Lammeren | Mar. 28, 1939 |
| 2,306,834 | Tipton | Dec. 29, 1942 |
| 2,351,213 | James | June 13, 1944 |
| 2,671,357 | Foley | Mar. 9, 1954 |
| 2,739,494 | Russell | Mar. 27, 1956 |
| 2,771,795 | Orr | Nov. 27, 1956 |
| 2,782,659 | Kelley | Feb. 26, 1957 |
| 2,900,845 | Tielens | Aug. 25, 1959 |
| 2,932,220 | Nash | Apr. 12, 1960 |
| 2,933,951 | Russell | Apr. 26, 1960 |